US008533187B2

(12) United States Patent
Brewington et al.

(10) Patent No.: US 8,533,187 B2
(45) Date of Patent: Sep. 10, 2013

(54) AUGMENTATION OF PLACE RANKING USING 3D MODEL ACTIVITY IN AN AREA

(75) Inventors: Brian Edmond Brewington, Fort Collins, CO (US); Brian Gammon Brown, Longmont, CO (US); James Anthony Guggemos, Windsor, CO (US); Dale Hawkins, Erie, CO (US); Bryce Stout, Boulder, CO (US)

(73) Assignee: Google Inc., Mountain View, CA (US)

( * ) Notice: Subject to any disclaimer, the term of this patent is extended or adjusted under 35 U.S.C. 154(b) by 117 days.

(21) Appl. No.: 12/977,267

(22) Filed: Dec. 23, 2010

(65) Prior Publication Data
US 2012/0166431 A1  Jun. 28, 2012

(51) Int. Cl.
*G06F 7/00* (2006.01)

(52) U.S. Cl.
USPC ............................. 707/723; 707/724; 707/899

(58) Field of Classification Search
USPC .......................................... 707/723, 724, 899
See application file for complete search history.

(56) References Cited

U.S. PATENT DOCUMENTS

| | | | |
|---|---|---|---|
| 5,737,533 A | 4/1998 | de Hond | |
| 6,256,043 B1 | 7/2001 | Aho et al. | |
| 6,308,144 B1 | 10/2001 | Bronfeld et al. | |
| 7,336,274 B2 | 2/2008 | Kida | |
| 7,353,114 B1 | 4/2008 | Rohlf et al. | |
| 7,570,261 B1 | 8/2009 | Edecker et al. | |
| 7,698,336 B2 | 4/2010 | Nath | |
| 7,712,052 B2 | 5/2010 | Szeliski et al. | |
| 7,933,897 B2 | 4/2011 | Jones et al. | |
| 2002/0070981 A1 | 6/2002 | Kida | |
| 2005/0073585 A1 | 4/2005 | Ettinger et al. | |
| 2005/0128212 A1 | 6/2005 | Edecker et al. | |
| 2006/0004512 A1 | 1/2006 | Herbst et al. | |
| 2006/0271280 A1 | 11/2006 | O'Clair | |
| 2007/0076920 A1 | 4/2007 | Ofek | |
| 2007/0208719 A1 | 9/2007 | Tran | |
| 2007/0210937 A1 | 9/2007 | Smith et al. | |
| 2007/0273558 A1 | 11/2007 | Smith et al. | |
| 2007/0273758 A1 | 11/2007 | Mendoza et al. | |
| 2008/0002916 A1 | 1/2008 | Vincent et al. | |
| 2008/0033641 A1 | 2/2008 | Medalia | |
| 2009/0132646 A1 | 5/2009 | Yang et al. | |

(Continued)

OTHER PUBLICATIONS

International Search Report and Written Opinion, PCT/US 10/34692, dated Jul. 1, 2010.

(Continued)

*Primary Examiner* — Hung Q Pham
(74) *Attorney, Agent, or Firm* — Lerner, David, Littenberg, Krumholz & Mentlik, LLP

(57) ABSTRACT

Aspects of the invention relate generally to ranking geographic locations based on perceived user interest. More specifically, a database of three-dimensional models of buildings or other architectural features may be used to determine the level of user interest in a particular location and accordingly rank, for example, geographic locations or web or map search results with local intent. For example, various signals such as the number of models created by users for a particular location, the number of clicks or requests for the models of the particular location, the number of POIs contained within or associated with the models associated with the particular geographic location, number of categories associated with a model associated with the geographic location, number of embedded views or views of the models associated with the particular location on other web sites, and the age of the models associated with the particular geographic location.

19 Claims, 14 Drawing Sheets

(56) References Cited

U.S. PATENT DOCUMENTS

| | | |
|---|---|---|
| 2009/0315995 A1 | 12/2009 | Khosravy et al. |
| 2010/0076976 A1 | 3/2010 | Sotirov et al. |
| 2010/0250120 A1 | 9/2010 | Waupotitsch et al. |
| 2010/0257163 A1 | 10/2010 | Ohazama et al. |
| 2010/0305855 A1 | 12/2010 | Dutton et al. |
| 2011/0137561 A1 | 6/2011 | Kankainen |
| 2011/0270517 A1* | 11/2011 | Benedetti .................. 701/201 |
| 2011/0283223 A1* | 11/2011 | Vaittinen et al. .............. 715/781 |

OTHER PUBLICATIONS

International Search Report and Written Opinion for Application No. PCT/US2011/066009 dated May 22, 2012.

International Search Report and Written Opinion for Application No. PCT/US2011/066109 dated Sep. 27, 2012.

* cited by examiner

900

```
┌─────────────────────────────────────┐
│ Identify a number of points of interest │
│ associated with (bounded by or near) a │
│ 3D model of an object associated with │
│ 902 a particular geographic location │
└─────────────────────────────────────┘
                    │
                    ▼
┌─────────────────────────────────────┐
│ Determine an indicator value for the │
│ particular geographic location based on │
│ the number of points of interest │
│ 904 associated with the 3D model │
└─────────────────────────────────────┘
```

FIGURE 9

AUGMENTATION OF PLACE RANKING USING 3D MODEL ACTIVITY IN AN AREA

BACKGROUND OF THE INVENTION

Various network-based search applications allow users to enter one or more search terms and in response, receive a list of search results. These search services may also allow users to conduct "local" searches for information associated with a particular geographic location or area. A "local" search or a search with "local" intent may include search terms which provide a geographic context or constraint for a query. For example, a user may use the terms "pizza, Miami" in a map search. The "Miami" gives the query a local context, and accordingly, the user may be provided with search results related to pizza in the area of Miami. Similarly, a user may use the terms "empire state building, New York" in a web search. Again, the terms "New York" give the query a local context.

These services use numerous different types of ranking algorithms to ensure that the search results are both relevant to the user's query and displayed in a useful way. For example, some systems rank results based on the relevance to the search query as well as the reliability and safety of the search results. These search services may also rank and display search results according to the prominence of an entity or entities associated with the search result. For example if a user searches for "coffee house Seattle", the search application may also display a list of prominent (or well known, respected or important) websites or businesses based on the geographic location, here, Seattle.

Some services allow users to upload and share three-dimensional ("3D") models of various objects such as the interior or exterior of buildings, stadiums, ships, vehicles, trees, or terrain (for example, the Grand Canyon), etc. The objects may be associated with various types of information such as titles, descriptive data, user reviews, points of interest ("POI"), business listings, etc. Many of the objects and the models themselves, may be geolocated or associated with a geographic location such as an address or geolocation coordinates. Models may also be categorized. For example, a model of a skyscraper may be associated with one or more categories such as skyscrapers, buildings in a particular city, etc. In this regard, a user may search the database for models, for example, based on the associated title, geographic location, description, object type, collection, physical features, etc.

Once a user has selected a 3D model, the user may interact with the model. For example, a user may query the database for "the Eiffel Tower" and in response receive a list of search results including various models of the Eiffel Tower, in Paris, France, as well as other objects associated with or indexed by the search terms. Once a user has selected an object, for example, by clicking on a search result, the user may, among other actions, download, view, rotate, or comment on the model.

Services may also allow users to search, for example, for businesses or geographic locations on a world map. In response to a search query, the service may provide a map identifying, among other information, a 3D model or a link to a 3D model of a 3D model database. Again, the user may interact with the 3D model, for example, by clicking on the model.

BRIEF SUMMARY OF THE INVENTION

Aspects of the invention relate generally to ranking geographic locations based on perceived user interest. More specifically, a database of three-dimensional models of buildings or other architectural features may be used to determine the level of user interest in a particular location and accordingly rank, for example, geographic locations or web or map search results with local intent. For instance, various signals such as the number of models created by users for a particular location, the number of clicks or requests for the models of the particular location, the number of points of interest (PO's) contained within or associated with the models associated with the particular geographic location, number of categories associated with a model associated with the geographic location, number of embedded views or views of the models associated with the particular location on other web sites, and the age of the models associated with the particular geographic location.

One aspect of the invention provides a computer-implemented method. The method includes storing a list of geographic locations; accessing a database of 3D models of objects, a plurality of the 3D models each being associated with a respective geographic location of the list of geographic locations; a processor determining a user interest value for each particular geographic location of the list of geographic locations based on whether the particular geographic location includes the respective geographic location of a given one of the plurality of 3D models, wherein each user interest value is indicative of user interest in the particular geographic location; and ordering, by the processor, the list of geographic locations based on the determined values to produce an ordered list of geographic locations.

In one example, the user interest value for the particular geographic location is based on a number of 3D models associated with respective geographic locations included in the particular geographic location. In another example, the method also includes receiving user requests for one or more 3D models associated with respective geographic locations included in the particular geographic location for a period of time, and each user interest value is based on a number of user requests received during the period of time. In another example, each of the plurality of 3D models is associated with one or more points of interest, and each user interest value is based on a number of the points of interest associated with the 3D models associated with a respective geographic location that is included in the particular geographic location. In another example, each of the plurality of 3D models is associated with one or more user designated categories of objects, and each user interest value is based on a number of the categories associated with the 3D models associated with a respective geographic location that is included in the particular geographic location. In another example, the method also includes scanning a plurality of web sites to identify views of the 3D model associated with the respective geographic location included in the particular geographic location; and wherein the user interest value for the particular geographic location is based on the number of identified views. In another example, each particular 3D model of the plurality of 3D models is associated with a time value defining the age of the particular 3D model, and each user interest value is based on the time value associated with the 3D models associated with a respective geographic location that is included in the particular geographic location. In another example, the method also includes receiving a search query from a client device; identifying a list of search results based on the ordered list of geographic locations; and transmitting the search results to be displayed on a display of the client device based on the ordered list of geographic locations. In another example, the method also includes for each particular geographic location of the list of geographic locations, determining a weighted sum based on the determined value associated with the particular geographic location, and wherein ordering the list of geographic locations is also based on the weighted sums.

Another aspect of the invention provides a computer. The computer includes memory storing a list of geographic locations and a database of 3D models of objects. The memory also stores a plurality of the 3D models each being associated with a respective geographic location of the list of geographic locations. The computer also includes a processor coupled to the memory. The processor is operable to determine a user interest value for each particular geographic location of the list of geographic locations based on whether the particular geographic location includes the respective geographic location of a given one of the plurality of 3D models, wherein each user interest value is indicative of user interest in the particular geographic location; and order the list of geographic locations based on the determined values to produce an ordered list of geographic locations.

In one example, the processor is also operable to determine the user interest value for the particular geographic location based on a number of 3D models associated with a respective geographic location included in the particular geographic location. In another example, the processor is also operable to receive user requests for one or more 3D models associated with respective geographic locations included in the particular geographic location for a period of time; and determine each user interest value based on a number of user requests received during the period of time. In another example, each of the plurality of 3D models is associated with one or more points of interest, and the processor is further operable to determine each user interest value based on a number of the points of interest associated with the 3D models which are associated with a respective geographic location that is included in the particular geographic location. In another example, each of the plurality of 3D models is associated with one or more user designated categories of objects, and the processor is further operable to determine each user interest value based on a number of the categories associated with the 3D models which are associated with a respective geographic location that is included in the particular geographic location. In another example, the processor is also operable to scan a plurality of web sites to identify views of the 3D model associated with a respective geographic location included in each particular geographic location; and the processor is also operable to determine each user interest value for each particular geographic location based on the number of identified views. In another example, each particular 3D model of the plurality of 3D models is associated with a time value defining the age of the particular 3D model, and the processor is further operable to determine each user interest value based on the time value associated with the 3D models associated with a respective geographic location that is included in each particular geographic location. In another example, the processor is operable to receive a search query from a client device; identify a list of search results based on the ordered list of geographic locations; and transmit the search results to be displayed on a display of the client device based on the ordered list of geographic locations. In another example, the processor is also operable to, for each particular geographic location of the list of geographic locations, determine a weighted sum based on the determined value associated with the particular geographic location, and wherein ordering the list of geographic locations is also based on the weighted sums.

BRIEF DESCRIPTION OF THE DRAWINGS

FIG. 9 is yet another exemplary flow diagram in accordance with an aspect of the invention.

DETAILED DESCRIPTION

Figure 1:
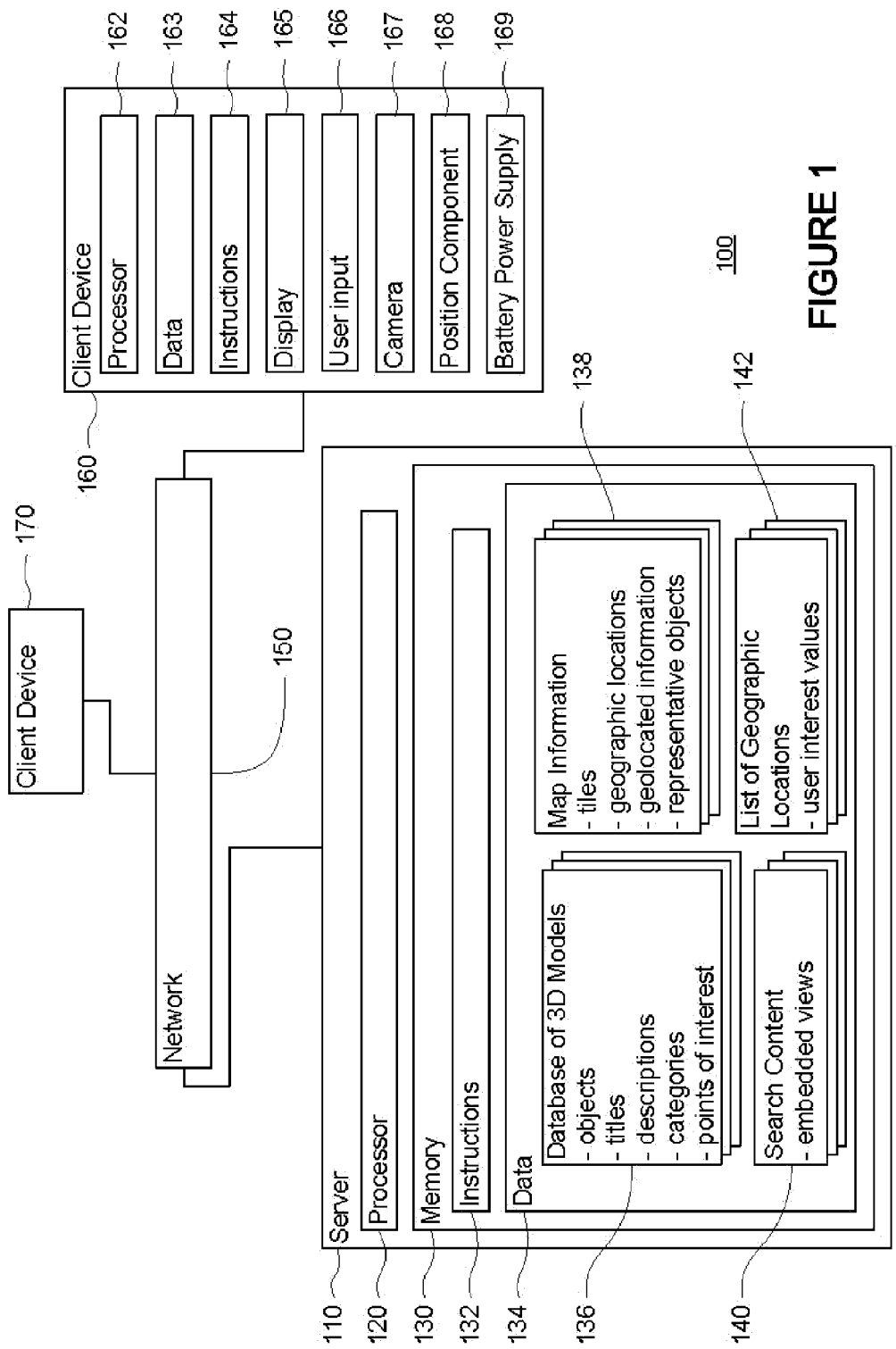
FIG. 1 is a functional diagram of a system in accordance with an aspect of the invention.
Figure 2:
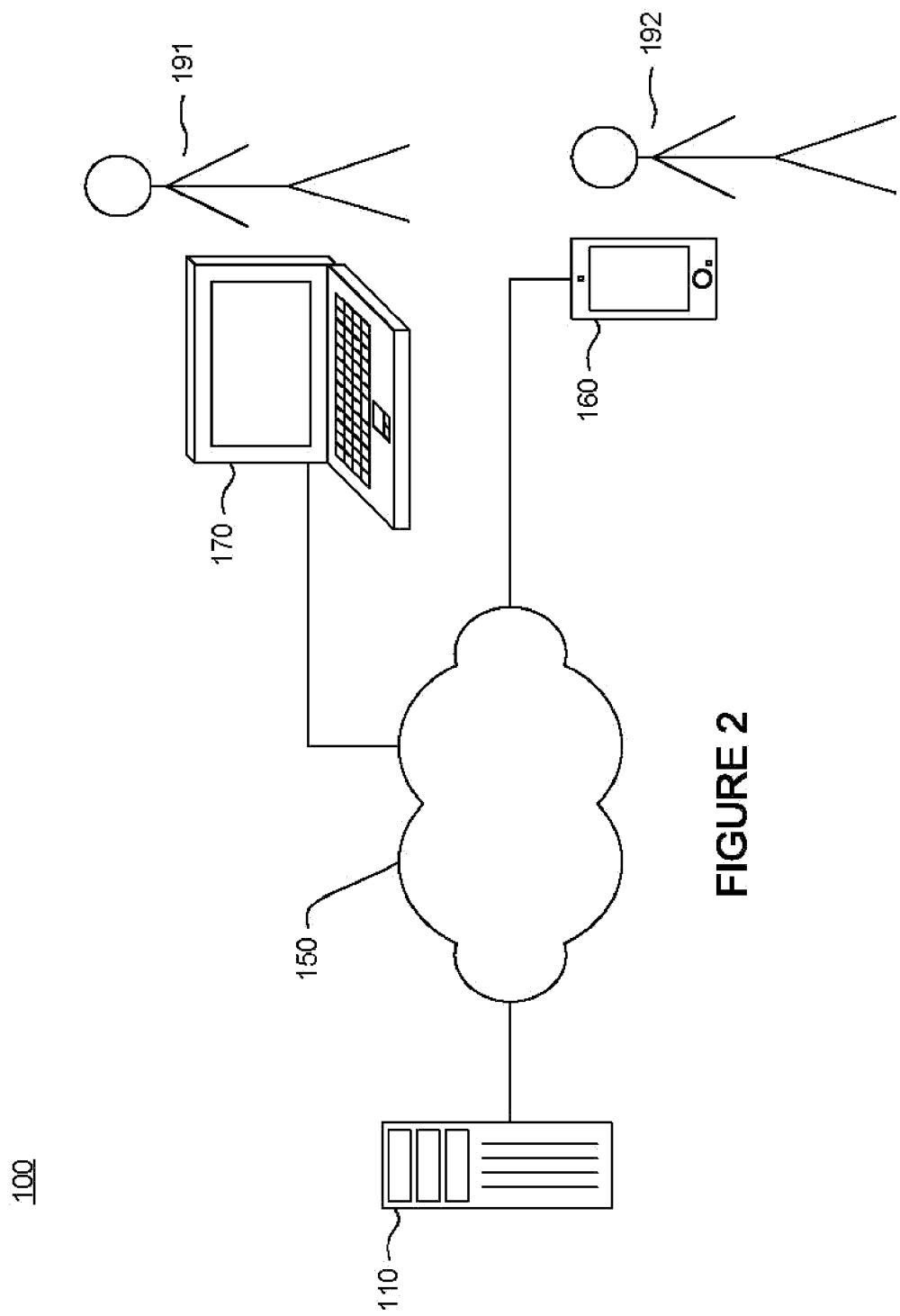
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods in accordance with aspects of the invention may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer, or a memory will be understood to include references to a collection of processors, computers, or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, accelerometer, speakers, a network interface device, a battery power supply 169 or other power source, and all of the components used for connecting these elements to one another.

As shown in FIG. 1, the client devices may also include geographic position component 168 to determine the geographic location and orientation of the device. For example, client device 170 may include a GPS receiver to determine the device's latitude, longitude and altitude position. Thus, as the client device changes location, for example by being physically moved, the GPS receiver may determine a new current location. The component 168 may also comprise software for determining the position of the device based on other signals received at the client device 170, such as signals received at a cell phone's antennas from one or more cell phone towers if the client device is a cell phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Data 134 of server 110 may include a database 136 of 3D models of various objects. These 3D objects may be associated with data provided by the model's creator (or uploading user) or other users. For example, a model may be associated with one or more categories, geographic locations, descriptions, user reviews, etc. The models may also be associated with user-designated collections. For example, when a user uploads a new model to the database, the user may designate the model as part of one or more collections, such as "mid-century modern" or "stuff I like." As a result, the new model may also be associated with other models also associated with the same collection. This information may be used to identify, index, and query the models.

If a particular object is geolocated (or associated with a geographic location), the 3d object data may also include a number of POIs contained within the object or very close to its perimeter. POIs may include, for example, businesses (such as retail locations, gas stations, hotels, supermarkets, restaurants, etc.), schools, federal or state government buildings, parks, monuments, statues, bridges, etc. This data may be also used to index the objects and provide search results in response to a user query of the database.

Server 110 may access map information 138, at least a portion of which may be transmitted to the client device. For example, the server may store map tiles, where each tile is a map image of a particular geographic area. A single tile may cover an entire region, such as a state, in relatively little detail and another tile may cover just a few streets in high detail. In that regard, a single geographic point may be associated with multiple tiles, and a tile may be selected for transmission based on the desired level of zoom. The map information is not limited to any particular format. For example, the data may comprise street maps, satellite images, or a combination of these, and may be stored as vectors (particularly with respect to street maps), bitmaps (particularly with respect to satellite images), etc.

The map information 138 may include various types of geolocated information, such as, buildings, roadways, waterways, POIs, and other features which may be used to display a map of a given location.

The map information may also include representative 3D objects selected from database 136. For example, there may be a plurality of models of the "Eiffel Tower" stored in database 136. A particular 3D model may be selected to represent the Eiffel Tower at the map location of Paris, France. The selected model may be selected manually or by the server based on various criteria including, for example, question and answer sessions with the model's designer, the level of accuracy and detail, the file size, and even how fast the model may load on a client device when requested from the server. The model selected to represent an object at a particular geographic location may change over time as new models are generated and uploaded by users.

The various map tiles, vectors, etc. may each be associated with geographical locations, such that the server 110 and/or a client device are capable of selecting, retrieving, transmitting, or displaying one or more tiles in response to receiving a geographical location. For example, the client device may transmit a request to the server. The server may identify relevant information and transmit the information to the client device. The client device may receive the relevant information and use it to render a map image on a display of the client device.

The server may also access search content 140. In addition to querying the map information 138, the server may also access web content and other information in response to a user request for information.

Data 134 may also include a list of geographic locations 142. This information may be stored as part of map information 138 or independent of the map information. Each particular geographic location of the list of geographic locations may be associated with a user interest value based on the perceived user interest in 3D models associated with the particular geographic location. As described in more detail below, these values may be used, for example, to rank and order the list of geographic locations or search results associated with the geographic locations.

Various operations in accordance with aspects of the invention will now be described. It should also be understood that the following operations do not have to be performed in the precise order described below. Rather, various steps can be handled in a different order or simultaneously.

The server may use 3D object data to quantify user interest in a particular geographic location. In one example, the server may determine the number of models of a particular geolocated object which have been uploaded by users and use this number as an indicator of user interest. For example, more 3D models of a particular geolocated object or location may imply a greater user interest in that entity or location.

In another example, the server may use a threshold value based on the number of co-located models as an indicator of user interest. In one example, the number of co-located models may be used as a weighted factor. In another example, if the number of models of an object or containing the object is greater than the threshold value, for example, more than 5, the location may be considered "interesting." In other words, if more users are creating and uploading 3D models associated with a particular geographic location, the more likely other user may be interested in the particular geographic location. It will be understood that as the total number of models increases, this "threshold" number of models may also increase. If there are zero, one or very few models of a particular location, the interest in a particular location may be assumed to be much lower. For example, database 136 may include twenty different models of or which contain the Eiffel Tower but only one model of the Hopital de Longjumeau (both in Paris, France). In the present example, because of the relatively high number of models of the Eiffel Tower, user interest in these 3D objects and the user interest indicator value for this location may be higher than those associated with the Hopital de Longjumeau.

Figure 3:
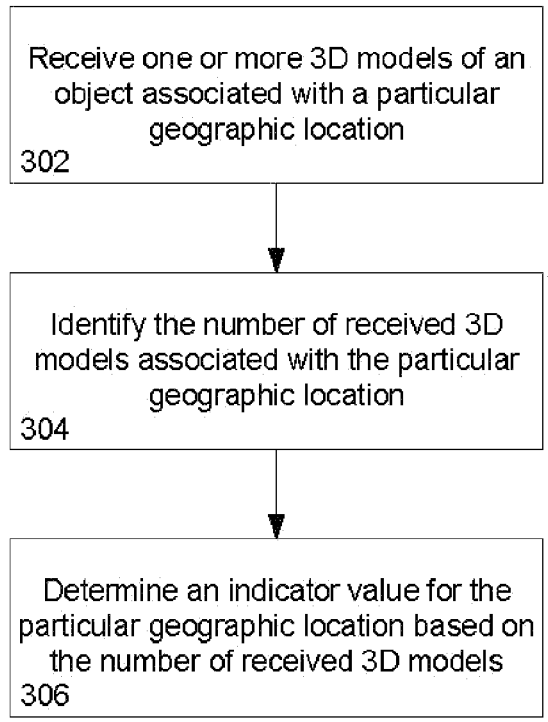
FIG. 3 is an exemplary flow diagram in accordance with an aspect of the invention.

As shown in the exemplary flow diagram 300 of FIG. 3, the server receives one or more 3D models of an object at block 302. The object is associated with a particular geographic location. At block 304, the server identifies the number of received (uploaded or stored) 3D models associated with the particular geographic location. At block 306, the server determines an indicator value, indicative of the level of user interest in a geographic location, for the particular geographic location based on the number of received 3D models.

Figure 4:
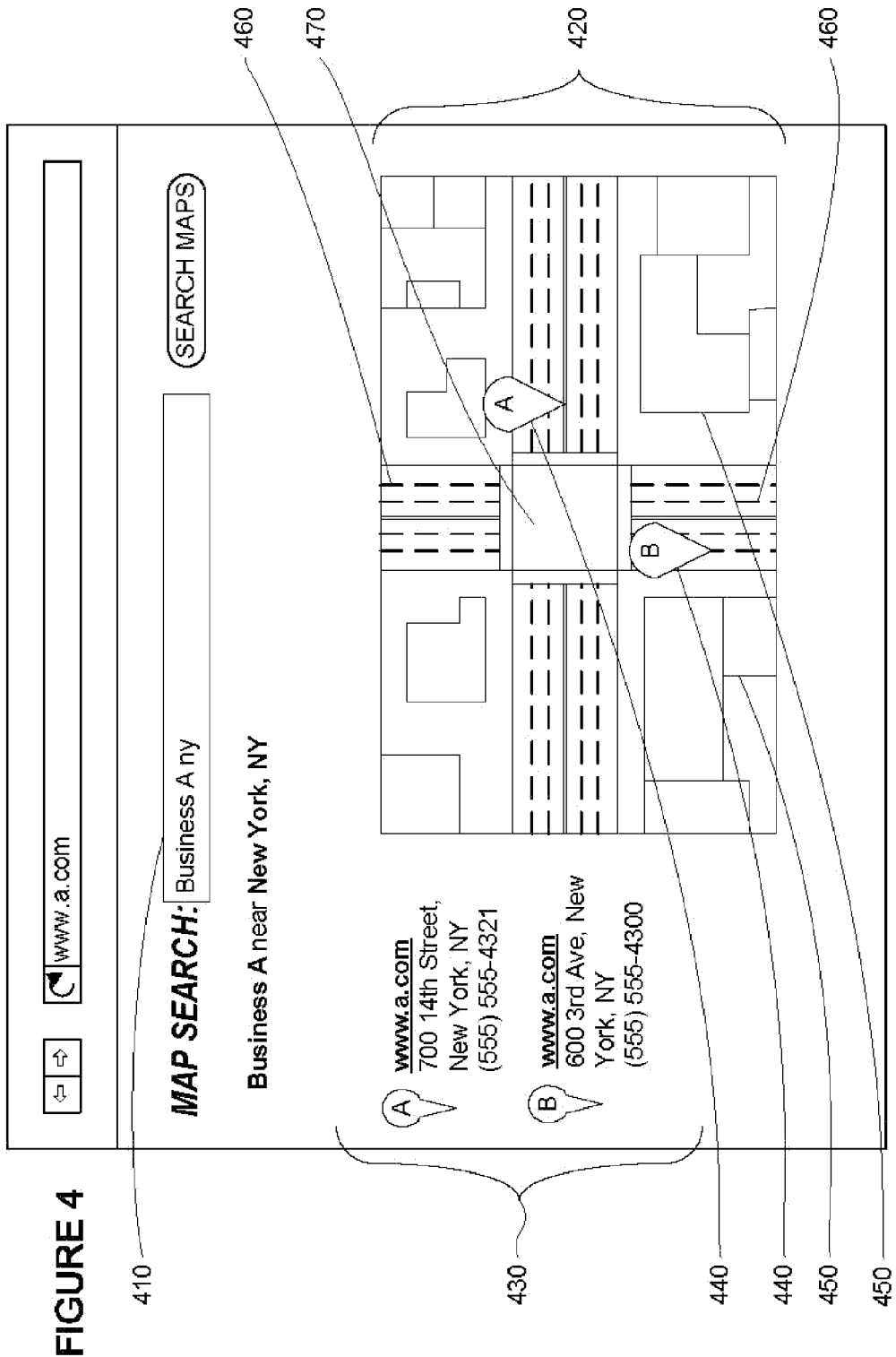
FIG. 4 is an exemplary screen shot in accordance with an aspect of the invention.
Figure 5:
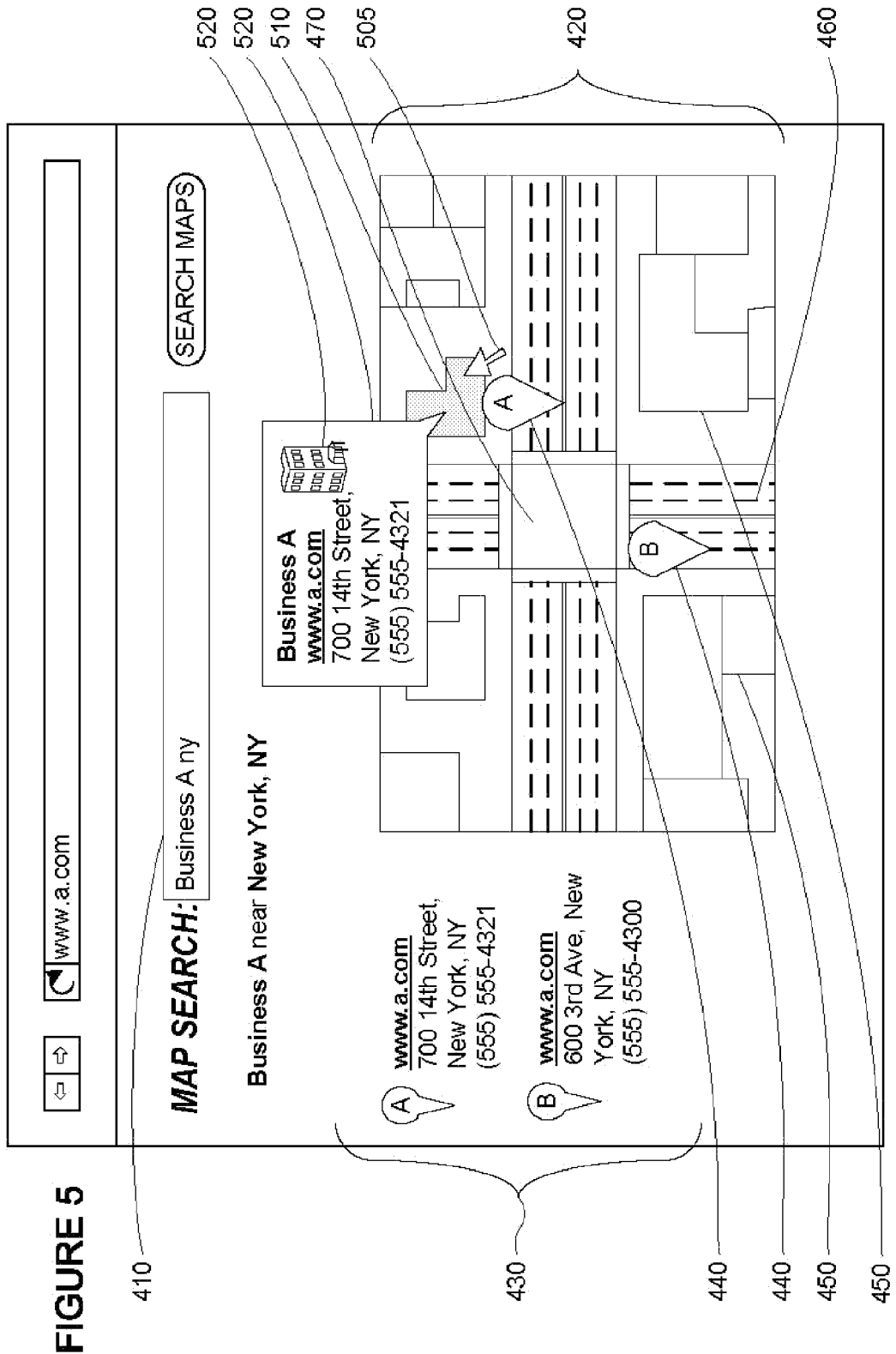
FIG. 5 is another exemplary screen shot in accordance with an aspect of the invention.
Figure 6:
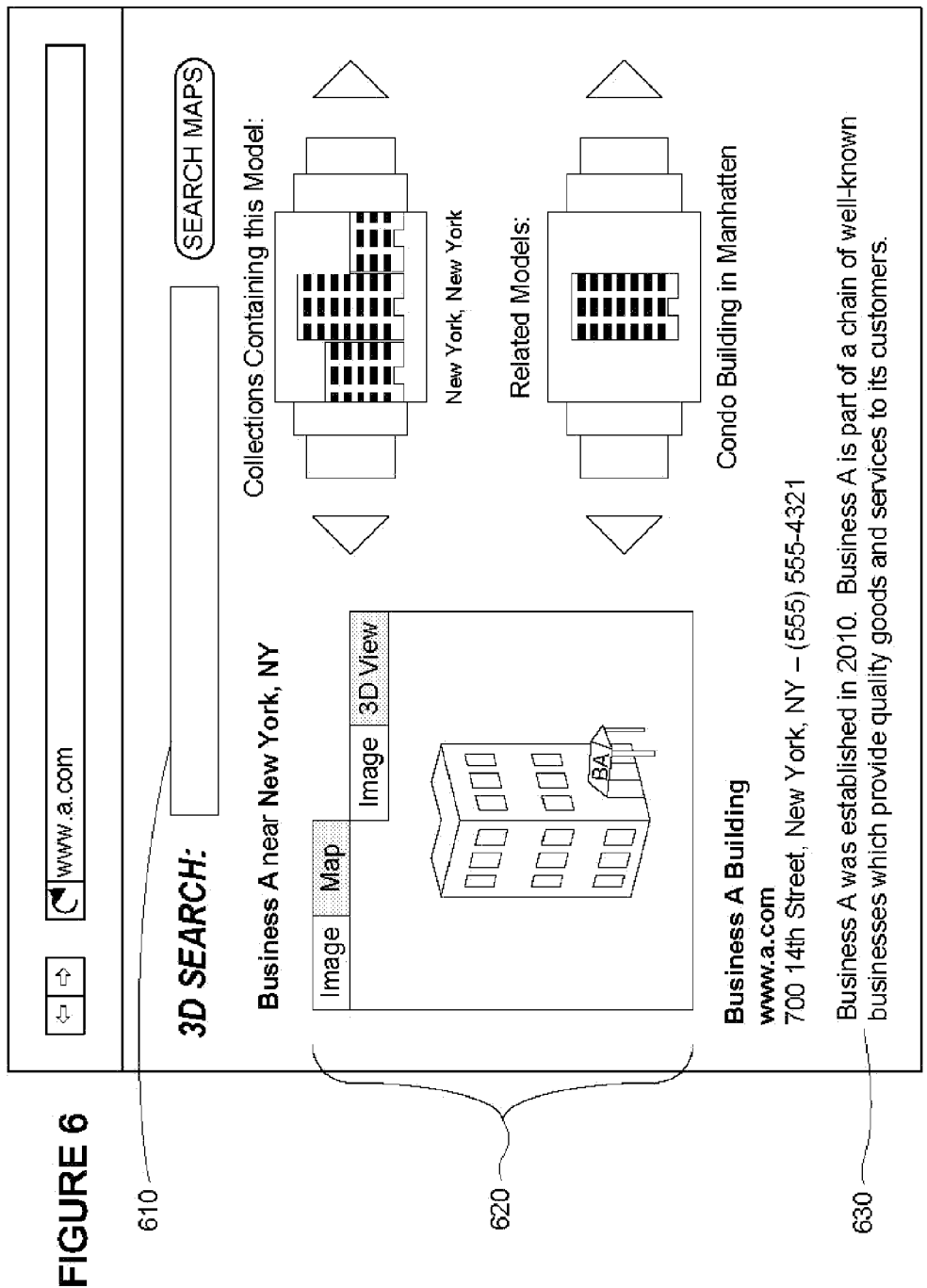
FIG. 6 is a further exemplary screen shot in accordance with an aspect of the invention.

In another example, the server may use the number of clicks on a particular geolocated model of an object over a period of time as an indicator of user interest in the particular geographic location. For example, a client device may request map information for New York City. In the example of FIG. 4, the user enters a local search 410 for Business A, NY. The server may query the map information and return a map 420 of New York City, various search results 430, and related map markers 440. The map may also include 2D or 3D representations, images, photos, etc. of buildings 450, roadways 460, intersection 470, etc. The user may select the model by clicking on a 2D representation or image or a building to view the model more closely or request additional information about the Empire State Building. For example, as shown in FIG. 5, the user may maneuver a mouse icon 505 over and/or click on a building 510 and receive a popup 520 with a view of a 3D model. The user may select model 530 by clicking on the model using mouse 505. In response, the user may be presented with a display of the 3D model and various other information as shown in FIG. 6.

The number of times a particular representative model has been selected for a given period of time may be recorded and stored by the server. Each "selection" or "click" event may be associated with the model and stored, for example as a running tally or average. Preferably, privacy protections are provided for the user data including, for example, anonymization of personally identifiable information, aggregation of data, filtering of sensitive information, encryption, hashing or filtering of sensitive information to remove personal attributes, time limitations on storage of information, or limitations on data use or sharing. Preferably, data is anonymized and aggregated such that any individual user data is not revealed.

As an example, model A may receive an average of 100 clicks per day for the last 30 days, whereas model B may receive an average of 120 clicks per day for the last 10 days. In another example, the same average number of clicks per day may be received if model A receives a total of 1000 clicks in the last 10 days and model B receives a total of 1200 clicks in the last 10 days. The greater the number of clicks on a particular representative model over a given period of time, the greater the level of user interest (and indicator value) of the geographic location associated with the model.

As noted above, the representative model selected for a particular geographic location may change over time. Thus, the count may be recorded for a particular geographic location and may span multiple models. For example, model A may be selected to represent a given location from time t=0 to time t=5 days, and model B may replace model A as the selected model between time t=5 days and t=10 days. In order to determine the number of clicks for the period t=0 to t=10, the server may record the click data associated with model A and model B and combine these counts together. The greater the number of clicks on a given model or chain of models, the greater the level of importance or user interest in the geographic location. Again, the server may use this information to determine the level of user interest or an indicator value for search results associated with the object or the object's geographic location.

Figure 7:
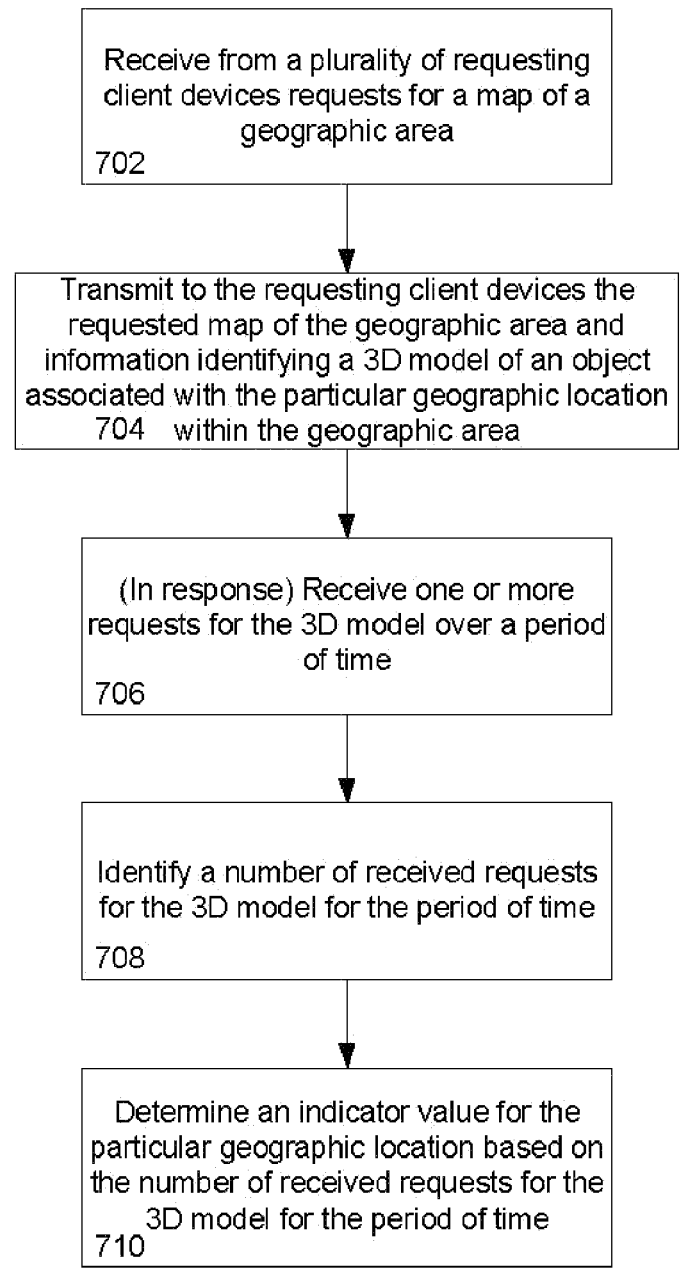
FIG. 7 is another exemplary flow diagram in accordance with an aspect of the invention.

As shown in the exemplary flow diagram 700 of FIG. 7, the server receives, from a plurality of requesting client devices, requests for a map of a geographic area at block 702. In response, the server transmits the requested map of the geographic area to the requesting client devices at block 704. The server also transmits information identifying a 3D model of an object associated with a particular geographic location within the geographic area of the transmitted map. The server then receives, from one or more of the client devices, one or more requests for the 3D model at block 706 (for example, where the user has clicked on the information identifying a 3D model). The server identifies the number of received requests for the 3D model received over a period of time at block 708. The server then determines an indicator value for the particular geographic location based on the number of received requests for the 3D model for the period of time at block 710.

In addition to the number of clicks a given model receives, the server may also determine a user interest value based on various other criteria associated with user actions such as how often a model is requested from database 136 (for example by entering a query into search box 610 and selecting a resulting 3D model or by selecting the model as shown in FIG. 5), the average length of time a model or the description associated with a model is viewed by users (for example, how long the user views the model 620, description 630, etc.), etc. Again the greater these values, the greater the user interest in the model, and the greater the perceived level of user interest and indicator value for the geographic location.

Figure 8:
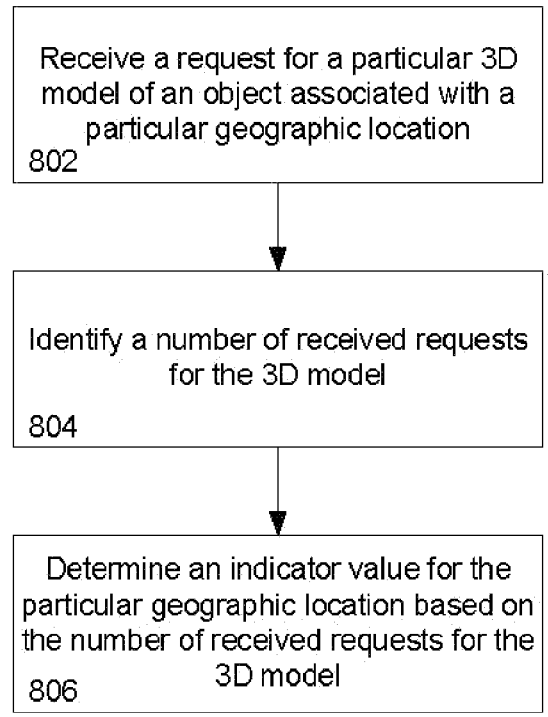
FIG. 8 is a further exemplary flow diagram in accordance with an aspect of the invention.

As shown in the exemplary flow diagram 800 of FIG. 8, the server receives a request for a particular 3D model, for example, where a user selects or clicks on the 3D model in a list of search results as shown in block 802. The server identifies the number of received requests for the 3D model at block 804. The server then determines an indicator value for the particular geographic location based on the number of received requests for the 3D models at block 806.

In a further example, the server may use the number POI associated with, nearby, or contained within the bounds of a geolocated model (based on its map location) as an indicator of user interest in the particular geographic location. For example, a particular 3D object may be associated with a given geographic location. The server may identify one or more POIs of the map information at or near the given geographic location. In one example, if the geolocated object is a building or other structure, an identified POI may be located within the building (at the same address), in the courtyard of the building, or next to the building. The identified POIs may be associated with the 3D object and this association may be stored as described above.

If a particular location is associated with a relatively high number of POI, the location may be considered more interesting to users and thus be associated with a greater interest value. For example, a first building including only a bookstore business may be considered less interesting to users than a second building associated with a coffee shop, a bookstore business, and a park. Thus, the second building associated with three POIs may have a higher perceived level of user interest (or indicator value) than that of the first building associated with a single POI.

As shown in the exemplary flow diagram 900 of FIG. 9, the server identifies a number of points of interest associated with a 3D model of an object associated with a particular geographic location at block 902. A point of interest may be associated with a 3D model, for example, if the point of interest is contained within the boundaries of the 3D model or the object or is located proximate to the object. As shown in block 904, the server then determines an indicator value for the particular geographic location based on the number of points of interest associated with the 3D model.

In yet another example, the server may use the number of collections or tags associated with a geolocated model as an indicator of user interest in the particular geographic location. For example, users which designate a model as part of a particular collection may be likely to do so because the user admires the model and presumably the geographic location of the real object. Models associated with a relatively high number of collections, for example 5 or more, may therefore have a higher level user interest and a higher indicator value than models which are contained in very few collections, or none at all.

Figure 10:
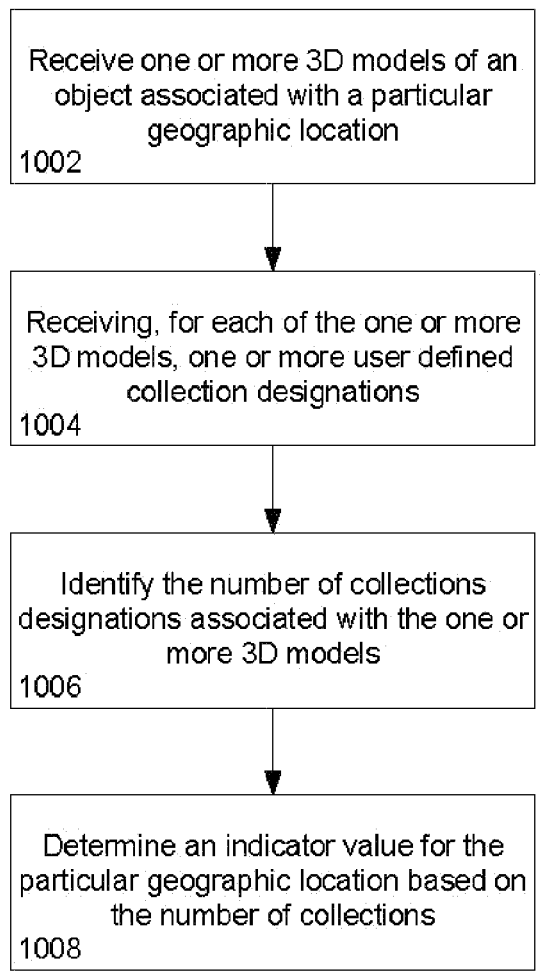
FIG. 10 is an exemplary flow diagram in accordance with an aspect of the invention.

As shown in the exemplary flow diagram 1000 of FIG. 10, the server receives one or more 3D models of an object associated with a particular geographic location at block 1002. The server then receives, for each of the one or more 3D models, one or more user defined collection designations at block 1004. The server then identifies the number of collections associated with the one or more 3D models at block 1006. The server then determines an indicator value for the particular geographic location based on the number of collections at block 1008.

In still a further example, the server may use the number of embedded views of a geolocated model as an indicator of user interest in the particular geographic location. Embedded views may be described as two-dimensional views or images of a model displayed in various ways on a web site (as opposed to views of the 3D model displayed in the context of database 136). For example, a website advertising, promoting or mentioning a particular 3D model may include a two dimensional image of the 3D model as described above. The server may provide the two dimensional views of the 3D model to users upon request and thus identify the number of requested images as well as embedded views. For example, based on the URL used, when a user clicks to view an embedded view of an image or the image is requested in order to be displayed to a user, a particular servlet may receive a request for the embedded views. For example, an embedded view may take the form of: <iframe src="http://a.com/3dwarehouse/mini?mid=34cb74ce8e5a1ed97d4896c8a58e0569&etyp=im&width=400&h eight=300" frameborder="0" scrolling="no" marginheight="0" marginwidth="0" width="400" height="300"></iframe> where as an image of the model used in the database context may take the form of <http://a.com/3dwarehouse/download?mid=34cb74ce8e5a1ed97d4896c8a58e0569&rtyp=lt&ctyp=other&ts=1286212773000>. In this example, the first URL uses the "mini" servlet, and the second uses the "download" servlet. Thus, based on the type of servlet providing the image, the server may identify whether the request is for an embedded view and may record the number of requests.

The greater the number of requests for embedded views of a particular geolocated model, the greater the presumed user interest value in the model as well as the model's associated geographic location. Thus, the level of user interest or indicator value in the geographic location of a model which appears in, for example 5 or more web sites, may be higher than the user interest in the geographic location of a model which appears in very few or no web sites.

Figure 11:
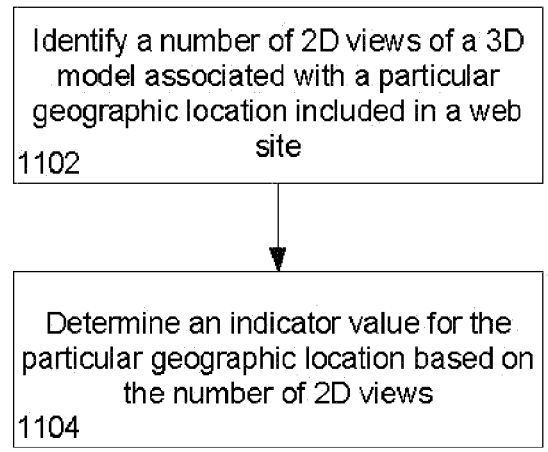
FIG. 11 is another exemplary flow diagram in accordance with an aspect of the invention.

As shown in the exemplary flow diagram 1100 of FIG. 11, the server identifies a number of 2D views of a 3D model associated with a particular geographic location at block 1102. These "views" may be included in various web sites. The server then determines an indicator value for the particular geographic location based on the number of 2D views at block 1104.

In yet a further example, the server may use the length of time that a particular geographic location has been associated with one or more geolocated models. For example, the age, or how long a particular geolocated model has been included in the database, may indicate the user interest or importance of the associated geographic location. This may be, for example, because at least one user thought an object at the geographic location was interesting enough to create and upload a 3D model. If a particular geolocated model has been included in the database for a relatively long period of time, such as four or more years, this may indicate a higher level of user interest or indicator value for the geographic location than another geographic location which has no associated models or models which have existed for a much shorter period of time, such as one year or less.

Figure 12:
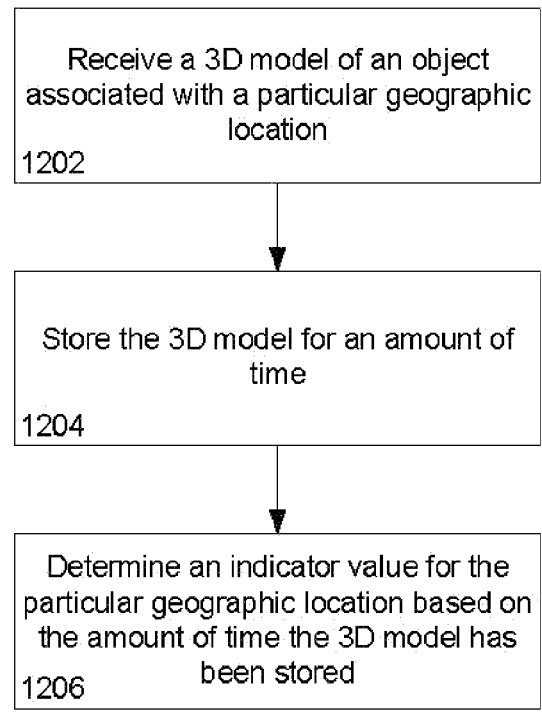
FIG. 12 is a further exemplary flow diagram in accordance with an aspect of the invention.

As shown in the exemplary flow diagram 1200 of FIG. 12, the server receives a 3D model of an object associated with a particular geographic location at block 1202. The server stores the 3D model for an amount of time at block 1204. The server then determines an indicator value for the particular geographic location based on the amount of time the 3D model has been stored at block 1206.

The above examples of indicators and values indicative of user interest may be used alone or in combination, for example, to rank and order a list of geographic locations. For example, each particular location of a given list of geographic locations may be associated with a user interest value. The user interest value may indicate the level of user interest in a particular location based one or more of the factors determined from the 3D model data, etc. described above.

The user interest value may be used to rank the list of geographic location or may simply be associated with the geographic location and the association stored in memory accessibly by the server. The values may be determined periodically or updated as the various indicator's contributions to the value may change overtime. For example, a process may be run periodically, such as each night, in order to determine a user interest value for each geographic location of the list of geographic locations. The user interest value may be associated with each entity and stored. The server may receive a query and in response, identify a list of search results based on relevance to the query. The server may also determine a relevancy-to-query value. For each particular entity returned as a search result for a query, the server may retrieve the stored user interest value associated with the geographic location of each particular entity. The user interest values may be combined with the respective relevance-to-query score for each search result in the identified list of search results in order to determine the ranking of the results. For example, if an entity X and an entity Y include identical relevancy-to-query values for a given query and are otherwise identical, the server may use the user interest values to determine whether the entity X and entity Y will be displayed, and if so, the order in which they will be displayed to the user. Alternatively, these values may be computed by the server for a list of search results in real time in response to receiving a search query and identifying the list of search results.

The user interest value may be based on one or more of the indicators described above, such as the number of models of a particular object; the number of clicks on a particular geolocated model; criteria associated with user actions; the number POI associated with, nearby, or contained within the bounds of a geolocated model; and the length of time that a particular geographic location has been associated with one or more geolocated models. For example, if there are multiple user interest signals being considered, the user interest values may be combined by way of a mathematical function so as to determine an aggregate user interest over all of the plurality of user interest indicators.

One example of this type of calculation may be a weighted sum of the user interest indicators, where a greater weight is given to stronger indicators of user interest. For example, the weighted sum may be written as:
sum $\{i=0\}^{\{i=N\_\{user\_interest\_factors\}\}}$ $\{weight\_\{user\_interest\_factor\_i\}*\{user\_interest\_factor\_i\}\}$.
If the weights sum to 1, this may be a weighted average.

In one example, a user creating a 3D model at a location may be a stronger indicator of user interest than a single user interacting with the same model. In this example, the weighted user interest value for a particular model may be: (weight_{number of 3D models overlapping this one}*number_of_3d_models_overlapping_this_one)+ (weight_{number of interactions with the model in the last week}*{number_of_interactions_with_this_model_in_the_last_week}.

The value of weight_{number of 3D models over lapping this one} may be 0.99, while the value of weight_{number of interactions with the model in the last week} may be 0.01. In this example, a single model associated with a geographic location may indicate the same amount of user interest as 99 separate interactions with the model. Thus, if there is only a single model and the model was interacted with 99 times, the total user interest score may be calculated as: (0.99*1)+(0.1*99)=1.0.

Figure 13:
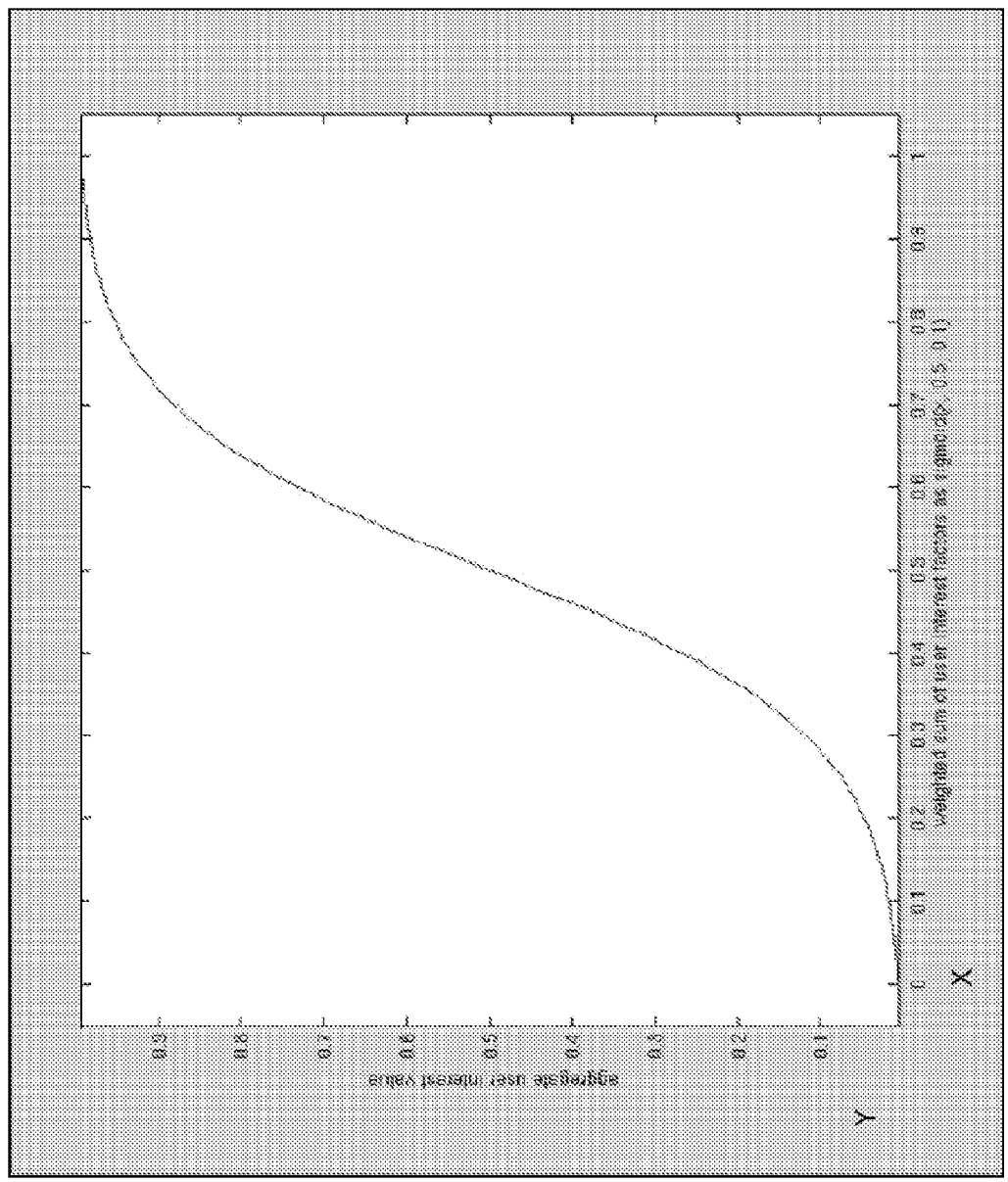
FIG. 13 is a graphical representation of data in accordance with an aspect of the invention.

In another example, the weighted sum described above may be passed through a thresholding nonlinearity such as a sigmoid. This may be illustrated using the program Matlab. For example, a sigmoid may be generated using the following:
function y=sigmoid(x, shift, scale)
% SIGMOID returns the sigmoid function
%
% USAGE: y=sigmoid(x, shift, scale)
%
% Calculates 1./(1+exp(−((x-shift)./scale)));
%
Y=1./(1+exp(−((x-shift)./scale))).
In this example, "x" may be the linear combination of user inputs (the weighted sum). FIG. 13 depicts this sigmoid where the shift has been set to 0.5 and the scale to 0.1.

Figure 14:
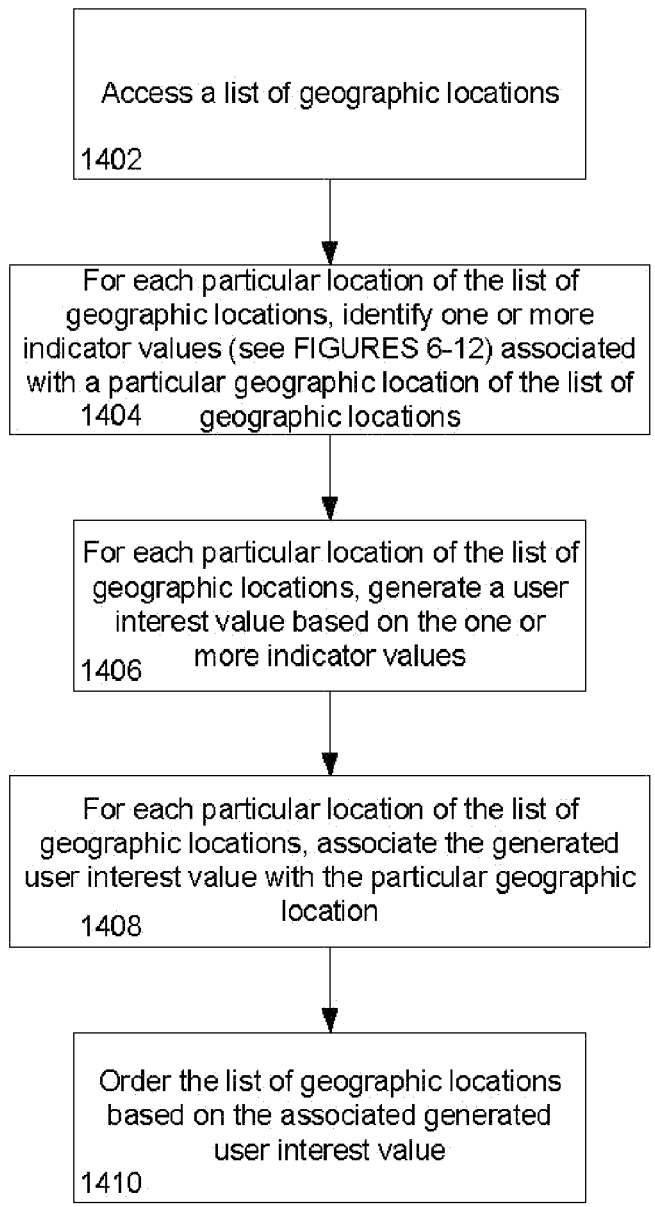
FIG. 14 is yet another exemplary flow diagram in accordance with an aspect of the invention.

As shown in the exemplary flow diagram 1400 of FIG. 14, the server accesses a list of geographic locations at block 1402. For each particular geographic location, the server identifies one or more indicator values (see, for example, FIGS. 6-12) associated with the particular geographic location and generates a user interest value based on the identified one or more indicator values as shown in block 1404 and 1406, respectively. The server associates the user interest value with the respective geographic location of the list of geographic locations at block 1408. The server then orders the list of geographic locations based on the respective user interest values as shown in block 1410.

In one example, a client device may request information from the server. If the request is a local search, including a geographic search constraint as described above, the server may select search results from the list of geographic locations. As noted above, the results may be ranked in advance or ranked as a result of the search request. The server may then identify the relevant search results, for example, in descending order based on the associated user interest values.

In another example, the user interest value may be used to remove or reorder search results in order to reduce spam search results. For example, a search for "empire state building, new york" may return a list of search results related to the true Empire State Building in New York city. In addition, the results may also include "spam" results. These spam results may contain text which refers to the queried terms, but the spam may also be associated with a location different from the geographic locations of the true Empire State Building and the of the 3D models contained in the database. Because the user interest value associated with the correct location of the Empire State Building may be relatively high as compared to the user interest value in the spam result's geographic location, the spam result may be removed or ranked very low so that it is either withheld from search results provided to the requesting client device, transmitted but not displayed on the display of the client device, or displayed at a relatively low position (for example, towards the bottom of a list of search results).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising:
storing a list of geographic locations, each geographic location describing a location relative to a map;
accessing, by a processor, a database including a plurality of 3D models of objects, each 3D model of the plurality of 3D models of objects being associated with a respective geographic location of the list of geographic locations;
determining, by the processor, a user interest value for each particular geographic location of the list of geographic locations based on whether that particular geographic location includes the respective geographic location of a given one of the plurality of 3D models of objects, wherein each determined user interest value is indicative of user interest in the particular geographic location; and
ordering, by the processor, the list of geographic locations based on the determined user interest values to produce an ordered list of geographic locations.

2. The method of claim 1, wherein the determined user interest value for the particular geographic location is further based on a number of 3D models associated with respective geographic locations included in the particular geographic location.

3. The method of claim 1, further comprising receiving user requests for one or more 3D models of the plurality of 3D models of objects associated with respective geographic locations included in the particular geographic location for a period of time, wherein each determined user interest value is further based on a number of the user requests received during the period of time.

4. The method of claim 1, wherein each 3D model of the plurality of 3D models of objects is associated with one or more points of interest, and each determined user interest value is further based on a number of the points of interest associated with 3D models of the plurality of 3D models of objects associated with a respective geographic location that is included in the particular geographic location.

5. The method of claim 1, wherein
each of the plurality of 3D models of objects is associated with one or more user designated categories of objects, and each determined user interest value is further based on a number of the categories associated with 3D models of the plurality of 3D models of object that are associated with a respective geographic location that is included in the particular geographic location.

6. The method of claim 1, further comprising:
scanning a plurality of web sites to identify views of the 3D model associated with the respective geographic location included in the particular geographic location; and
wherein the determined user interest value for the particular geographic location is further based on the number of identified views.

7. The method of claim 1, wherein each particular 3D model of the plurality of 3D models of objects is associated with a time value defining the age of the particular 3D model, and each determined user interest value is further based on the time value associated with 3D models of the plurality of 3D models of objects associated with a respective geographic location that is included in the particular geographic location.

8. The method of claim 1, further comprising:
receiving a search query from a client device;
identifying a list of search results based on the ordered list of geographic locations; and
transmitting the search results to be displayed on a display of the client device based on the ordered list of geographic locations.

9. The method of claim 1, further comprising, for each given geographic location of the list of geographic locations, determining a weighted sum based on the determined user interest value associated with the given geographic location, and wherein ordering the list of geographic locations is further based on the weighted sums.

10. A computer comprising:
memory storing a list of geographic locations and a database including a plurality of 3D models of objects, each 3D model of the plurality of 3D models of objects being associated with a respective geographic location of the list of geographic locations;
a processor coupled to the memory, the processor operable to:
access the memory;
determine a user interest value for each particular geographic location of the list of geographic locations based on whether the particular geographic location includes the respective geographic location of a given one of the plurality of 3D models of objects, wherein each determined user interest value is indicative of user interest in the particular geographic location; and
order the list of geographic locations based on the determined user interest values to produce an ordered list of geographic locations.

11. The computer of claim 10, wherein 1 the processor is further operable to determine the determined user interest value for the particular geographic location further based on a number of 3D models of the plurality of 3D models of objects associated with a respective geographic location included in the particular geographic location.

12. The computer of claim 10, wherein the processor is further operable to:
receive user requests for one or more 3D models of the plurality of 3D models of objects associated with respective geographic locations included in the particular geographic location for a period of time;

and determine each determine user interest value further based on a number of the user requests received during the period of time.

13. The computer of claim 10, wherein each 3D model of the plurality of 3D models of objects is associated with one or more points of interest, and the processor is further operable to determine each determined user interest value further based on a number of the points of interest associated with the 3D models of the plurality of 3D models of objects which are associated with a respective geographic location that is included in the particular geographic location.

14. The computer of claim 10, wherein each 3D model of the plurality of 3D models of objects is associated with one or more user designated categories of objects, and the processor is further operable to determine each determined user interest value further based on a number of the categories associated with 3D models of the plurality of 3D models of objects which are associated with a respective geographic location that is included in the particular geographic location.

15. The computer of claim 10, wherein the processor is further operable to:

scan a plurality of web sites to identify views of the 3D model of the plurality of 3D models of objects associated with a respective geographic location included in each particular geographic location; and wherein the processor is further operable to determine each determined user interest value for each particular geographic location further based on the number of identified views.

16. The computer of claim 10, wherein each particular 3D model of the plurality of 3D models is associated with a time value defining the age of the particular 3D model, and the processor is further operable to determine each determined user interest value based on the time value associated with the 3D models of the plurality of 3D models of objects associated with a respective geographic location that is included in the particular geographic location.

17. The computer of claim 10, wherein the processor is further operable to:

receive a search query from a client device;

identify a list of search results based on the ordered list of geographic locations; and transmit the search results to be displayed on a display of the client device based on the ordered list of geographic locations.

18. The computer of claim 10, wherein the processor is further operable to, for each given geographic location of the list of geographic locations, determine a weighted sum based on the determined user interest value associated with the given geographic location, and wherein ordering the list of geographic locations is further based on the weighted sums.

19. A non-transitory, tangible computer-readable storage medium on which computer readable instructions of a program are stored, the instructions, when executed by a processor, cause the processor to perform a method, the method comprising:

storing a list of geographic locations, each geographic location describing a location relative to a map;

accessing a database including a plurality of 3D models of objects, each 3D model of the plurality of 3D models of objects being associated with a respective geographic location of the list of geographic locations;

determining a user interest value for each particular geographic location of the list of geographic locations based on whether that particular geographic location includes the respective geographic location of a given one of the plurality of 3D models of objects, wherein each determined user interest value is indicative of user interest in the particular geographic location; and ordering, by the processor, the list of geographic locations based on the determined user interest values to produce an ordered list of geographic locations.

* * * * *

UNITED STATES PATENT AND TRADEMARK OFFICE
CERTIFICATE OF CORRECTION

| | |
|---|---|
| PATENT NO. | : 8,533,187 B2 |
| APPLICATION NO. | : 12/977267 |
| DATED | : September 10, 2013 |
| INVENTOR(S) | : Brian Edmond Brewington et al. |

It is certified that error appears in the above-identified patent and that said Letters Patent is hereby corrected as shown below:

In the Claims

Column 14, line 8, claim 5 "object" should read -- objects --.
Column 14, line 12, claim 6 "web sites" should read -- websites --.
Column 14, line 58, claim 11 after "wherein" delete "1".
Column 15, line 10, claim 13 after "with" delete "the".
Column 15, line 24, claim 15 "web sites" should read -- websites --.

Signed and Sealed this
Fourth Day of August, 2015

Michelle K. Lee
*Director of the United States Patent and Trademark Office*